(12) United States Patent
Chan

(10) Patent No.: US 7,059,465 B2
(45) Date of Patent: Jun. 13, 2006

(54) MULTI-DIRECTIONAL CONVEYOR

(76) Inventor: Edmund Chan, 1825 Capistrano Way, Burlingame, CA (US) 94010

( * ) Notice: Subject to any disclaimer, the term of this patent is extended or adjusted under 35 U.S.C. 154(b) by 0 days.

(21) Appl. No.: 10/818,997

(22) Filed: Apr. 6, 2004

(65) Prior Publication Data

US 2005/0217975 A1    Oct. 6, 2005

(51) Int. Cl.
*B65G 17/16* (2006.01)
(52) U.S. Cl. ............... 198/465.3; 198/799; 198/834
(58) Field of Classification Search ............ 198/465.3, 198/712, 799, 817, 834
See application file for complete search history.

(56) References Cited

U.S. PATENT DOCUMENTS 4,465,177 A * 8/1984 Dorner ................. 198/799
4,732,266 A * 3/1988 Dorner ................. 198/799
5,922,230 A * 7/1999 Yokota ................. 198/465.3

* cited by examiner

*Primary Examiner*—Khoi H. Tran

(57) ABSTRACT

Multi-directional conveyor with a pair of conveying belts, a plurality of sprockets, a sprocket holding frame, a gear reduced drive motor and a plurality of four sided trays. The trays are attached to the conveying belts by outwardly facing horizontal pins that are located at opposing offset corners of the trays and are capable of rotating within corner blocks that are affixed to the tray. The pins are fixedly attached to the conveying belts. The conveying belts have a plurality of evenly spaced apertures that accommodate the sprockets so that the drive motor can power the sprockets that are rotatably pinned to the frame thereby causing the belts to be driven in a linear fashion. The belts are capable of changing their angular orientation according to the spatial relationship of one sprocket to another. The belts are made of thin gauge stainless steel.

1 Claim, 2 Drawing Sheets

MULTI-DIRECTIONAL CONVEYOR

BACKGROUND OF THE INVENTION

This invention relates generally to the field of conveying devices and more specifically to a multi-directional conveyor.

An Age old problem is how to easily convey objects from one point to another. One well known solution to this problem is the development of conveyor belts. They are traditionally used to transfer items from one location to another. Usually a conveyor belt operates by an endless loop belt of flexible material such as rubber or thin gauge steel or the like which is stretched taught by rollers, one of which is usually driven by a gear reduced motor. In many cases there is a flat support structure that lies under the top layer of belting so that items placed on the belt can be supported as they travel in a linear fashion while riding on the belt. Some conveying belts are segmented so that they can be curved as necessary rather than traveling in a straight line. Some conveyor belts are built to be angled and include anti roll bars so that items carried on the belt can be raised or lowered thereby carrying items in a linear fashion to a higher or lower point.

However there is a deficiency in the prior art in that current conveyor belts can not carry items so that they remain in a constant horizontal orientation even when the belt is caused to change its angle in the vertical plain.

BRIEF SUMMARY OF THE INVENTION

The primary object of the invention is to provide a conveyor apparatus that allows objects to be transported in multiple plain.

Another object of the invention is to provide a conveyor apparatus that allows a plurality of trays to travel in an evenly spaced horizontal orientation regardless of the angle of change in the plain of the conveyor apparatus.

Another object of the invention is to provide a conveyor apparatus that allows a plurality of trays to remain stable during changes in angular orientation in the plain.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed multi-directional conveyor comprising: a pair of conveying belts having a width of approximately two inches, a plurality of sprockets, a sprocket holding frame, a gear reduced drive motor, a plurality of four sided trays, said trays attached to said conveying belts by outwardly facing horizontal pins that are located at opposing offset corners of said trays and are capable of rotating within corner blocks that are affixed to said tray, said pins fixedly attached to said conveying belts, said conveying belts having a plurality of evenly spaced apertures that accommodate said sprockets so that said drive motor can power said sprockets that are rotatably pinned to said frame thereby causing said belts to be driven in a linear fashion, and said belts capable of changing their angular orientation according to the spatial relationship of one sprocket to another.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
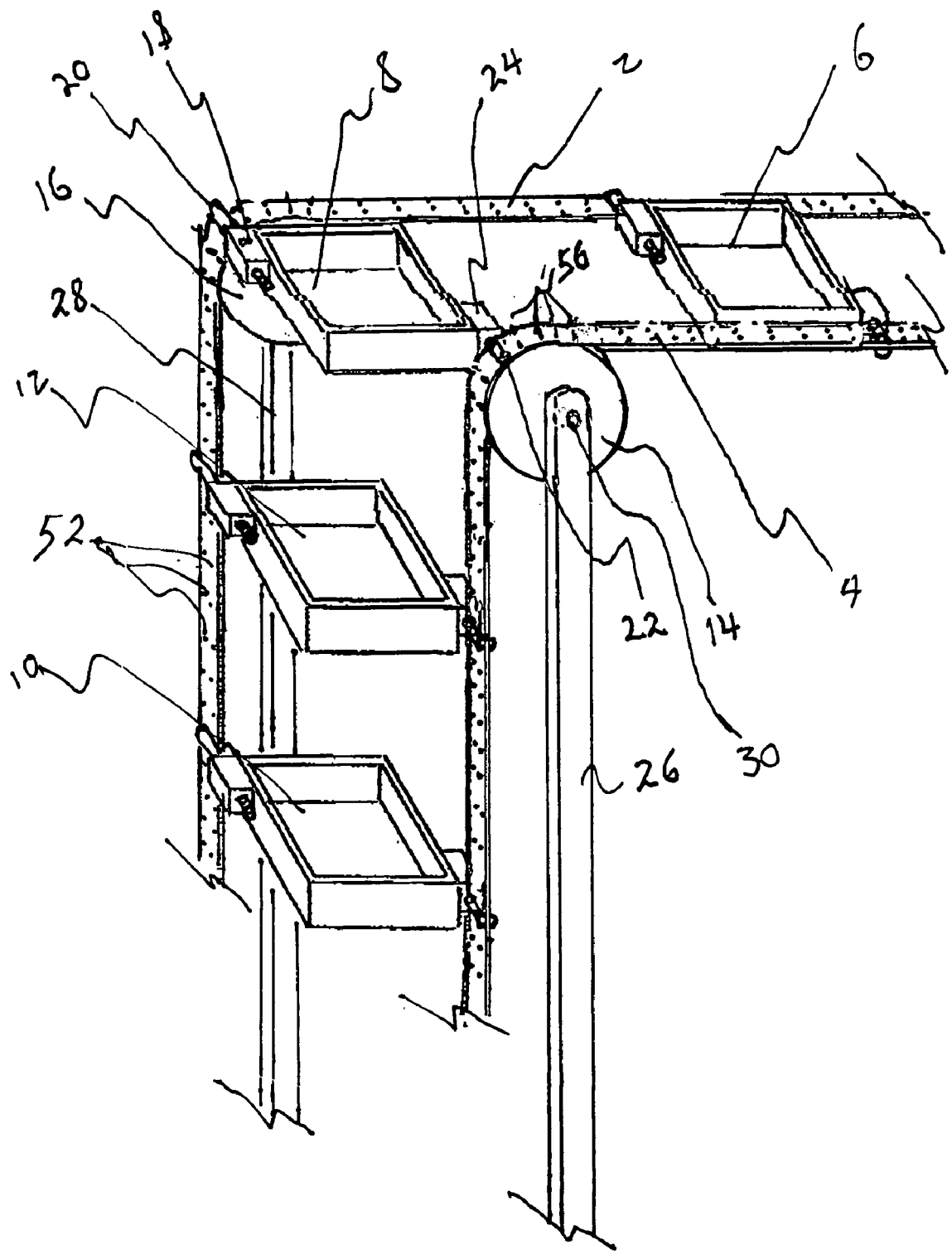
FIG. 1 is a perspective view of the invention.
Figure 2:
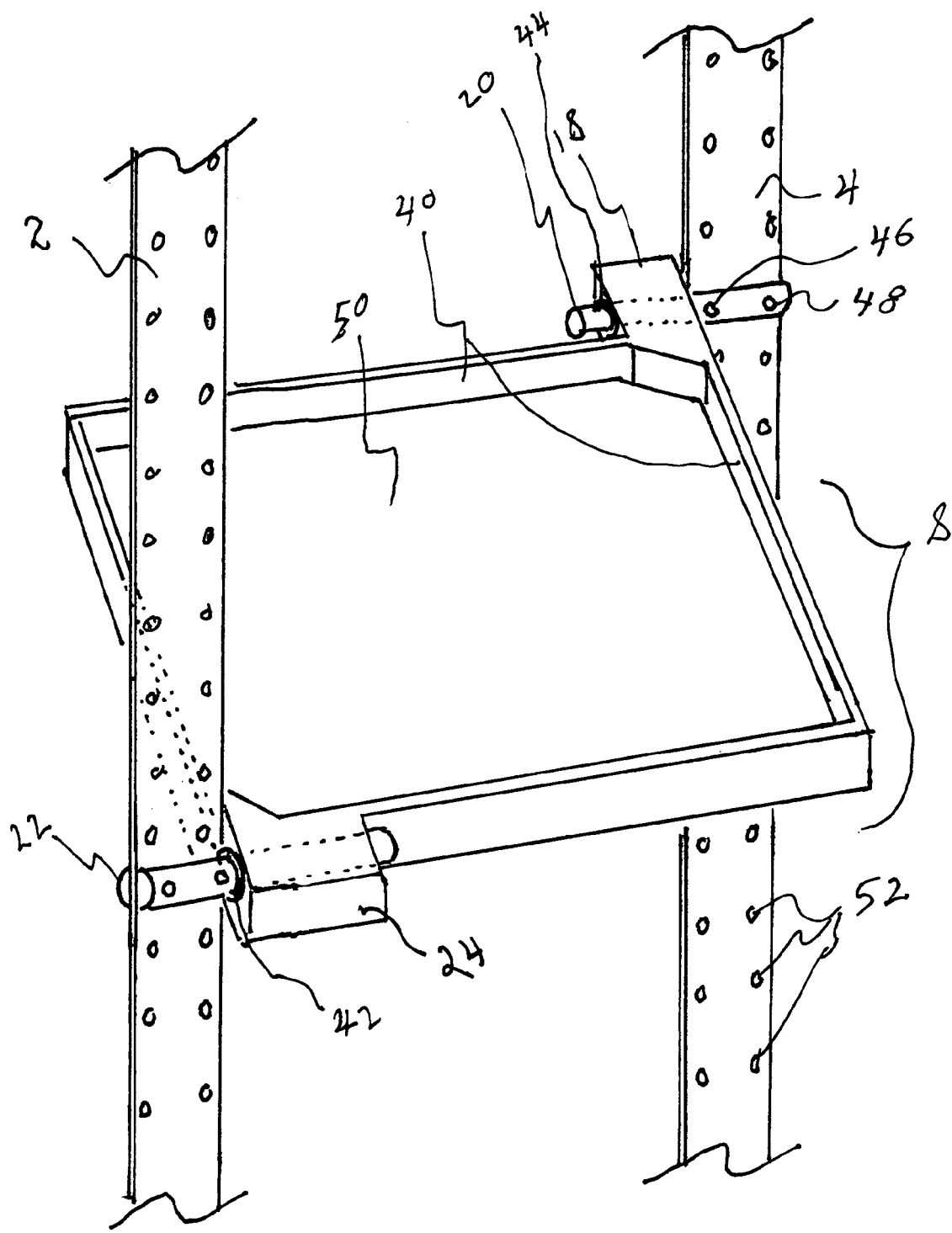
FIG. 2 is a perspective view of the tray assembly of the invention.

Referring now to FIG. 1 we see a perspective view of the multi-directional view of the present invention. A pair of stainless steel belts 2, 4 each belt being approximately two inches wide hold a plurality of trays 6, 8, 10, 12. The trays 6, 8, 10, 12 are attached to the belts by pins 20, 22 which can freely rotate within pin holding blocks 18, 24 so that as the belts 2, 4 change orientation as shown in this Figure, the trays can continue to remain in a horizontal orientation. My experiments have shown that a stainless steel belt having a width of approximately two inches gives ideal longitudinal support for the tray retaining pins so that each tray can remain in a stable horizontal orientation as it raises or lowers. Because the pins 20, 22 are a closely matched slip fit within blocks 18, 24, the tray tends to remain in a relatively rigid horizontal orientation and thereby can be used to transport items such as plates of food and the like without fear of the items being conveyed falling out. Sprockets 14, 16 include a twin set of drive pins 56 interact with apertures 52 located in the steel belts thereby driving the belts and associated trays in a linear direction. Support frame 26, 28 holds sprockets 14, 16 by mounting pins 30 thereby allowing the sprockets 14, 16 to freely rotate. A standard gear reduced drive motor, not shown powers one of the sprockets which, in turn, cause the belts 2, 4 and associated sprockets to be driven. FIG. 2 shows a view of a tray 8 and a partial view of belts 2, 4. The tray 8 is comprised of a flat bottom panel 50 and four surrounding side panels 40. Attachment pins 20, 22 are secured to belts 2, 4 by rivets 46, 48 or other standard fastening means. Pins 20, 22 are retained into blocks 18, 24 by C rings 42, 44. Because belts 2, 4 are relatively wide with relationship to the tray 50, and because the pins 20, 22 are attached to belts 2, 4 by widely spaced fasteners 46, 48 and because the slip fit of pins 20, 22 into blocks 18, 24 are relatively snug, the tray 8 remains in a relatively stable horizontal orientation even though the tray is held at only two opposing points. Therefore, the present invention allows items to be transported in a multidirectional manner while the trays that are carrying those items remain in a horizontal orientation.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. Multi-directional conveyor comprising:

A pair of conveying belts having a predetermined width;
- a plurality of outwardly facing horizontal pins fixedly attached to the belt to extends across and beyond the entire width of the belt;
- a plurality of fasteners attaching the pin to the belt along the length of the pin in at least two places;
- a plurality of four sided trays;
- a plurality of corner blocks affixing to opposing offset corners of the tray;
- wherein the trays are attached to the belts by engaging the pins rotatably to respective corner blocks on the trays;
- a plurality of sprockets;
- a sprocket holding frame;
- a gear reduced drive motor;
- said conveying belts having plurality of evenly spaced apertures that accommodate said sprockets so that said drive motor can power said sprockets that are rotatably mounted to said frame thereby causing said belts to be driven in a linear fashion; and said belts capable of changing the angular orientation according to the spatial relationship of one sprocket to another.

* * * * *